(12) United States Patent
Tonkyn et al.

(10) Patent No.: US 6,808,694 B2
(45) Date of Patent: Oct. 26, 2004

(54) $NO_x$ REDUCTION METHODS AND APPARATUSES

(75) Inventors: Russell G. Tonkyn, Kennewick, WA (US); Stephan E. Barlow, Richland, WA (US); M. Lou Balmer, Peoria, IL (US); Gary D. Maupin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 341 days.

(21) Appl. No.: 09/960,124

(22) Filed: Sep. 21, 2001

(65) Prior Publication Data

US 2003/0059357 A1 Mar. 27, 2003

(51) Int. Cl.[7] ................................................. B01J 8/02
(52) U.S. Cl. .............................. 423/213.7; 423/213.2
(58) Field of Search ........................................ 423/210

(56) References Cited

U.S. PATENT DOCUMENTS

| | | | |
|---|---|---|---|
| 3,983,021 A | * 9/1976 | Henis | 204/164 |
| 4,985,219 A | * 1/1991 | Helfritch et al. | 423/235 |
| 5,155,994 A | * 10/1992 | Muraki et al. | 60/275 |
| 5,407,652 A | * 4/1995 | Swamy et al. | 423/239.1 |
| 5,472,677 A | * 12/1995 | Farris et al. | 423/239.1 |
| 5,711,147 A | * 1/1998 | Vogtlin et al. | 60/274 |
| 5,782,085 A | * 7/1998 | Steinwandel et al. | 60/274 |
| 5,891,409 A | 4/1999 | Hsiao et al. | |
| 5,893,267 A | * 4/1999 | Vogtlin et al. | 60/274 |
| 5,914,015 A | * 6/1999 | Barlow et al. | 204/177 |
| 6,038,853 A | 3/2000 | Penetrante et al. | |
| 6,038,854 A | * 3/2000 | Penetrante et al. | 60/297 |
| 2003/0059357 A1 | * 3/2003 | Tonkyn et al. | |

OTHER PUBLICATIONS

Tonkyn, et al, "Lean $NO_x$ Reduction in Two Stages: Non–thermal Plasma Followed by Hetergeneous Catalysis", SAE International Fall Fuels and Lubricants Meeting and Exposition, Oct. 16–19, 2000, SAE Technical Paper 2000–01–2896.

M. Lou Balmer, et al, "$NO_x$ Destruction Behavior of Select Materials When Combined with a Non–Thermal Plasma", SAE International Fall Fuels and Lubricants Meeting and Exposition, Oct. 25–28, 1999, SAE Technical Paper 1999–01–3640.

* cited by examiner

*Primary Examiner*—Steven Bos
*Assistant Examiner*—William G. Wright, Sr.
(74) *Attorney, Agent, or Firm*—Wells St. John P.S.

(57) ABSTRACT

A $NO_x$ reduction method includes treating a first gas containing $NO_x$, producing a second gas containing $NO_2$, reducing a portion of the $NO_2$ in the second gas to $N_2$, and producing a third gas containing less $NO_x$ than the first gas, substantially all of the third gas $NO_x$ being NO. The method also includes treating the third gas, producing a fourth gas containing $NO_2$, reducing a portion of the $NO_2$ in the fourth gas to $N_2$, and producing a fifth gas containing less $NO_x$ than the third gas, substantially all of the fifth gas $NO_x$ being NO. Treating the first and/or third gas can include treatment with a plasma. Reducing a portion of the $NO_2$ in the second and/or fourth gas can include reducing with a catalyst. The method can further include controlling energy consumption of the plasmas independent of each other.

29 Claims, 5 Drawing Sheets

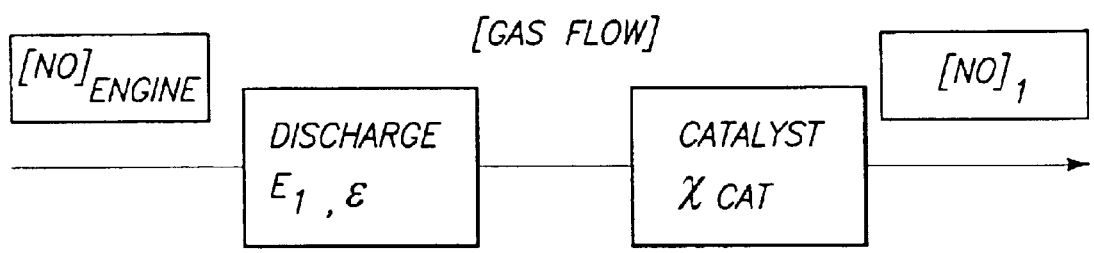
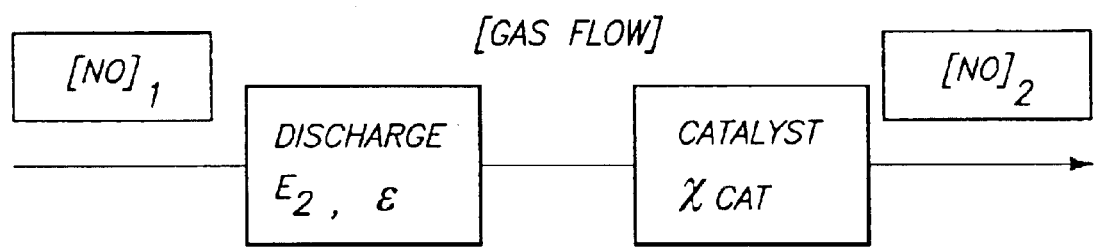
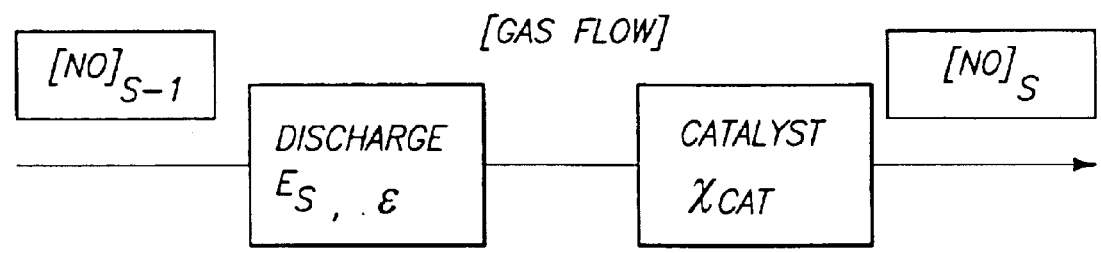
FIG. 1

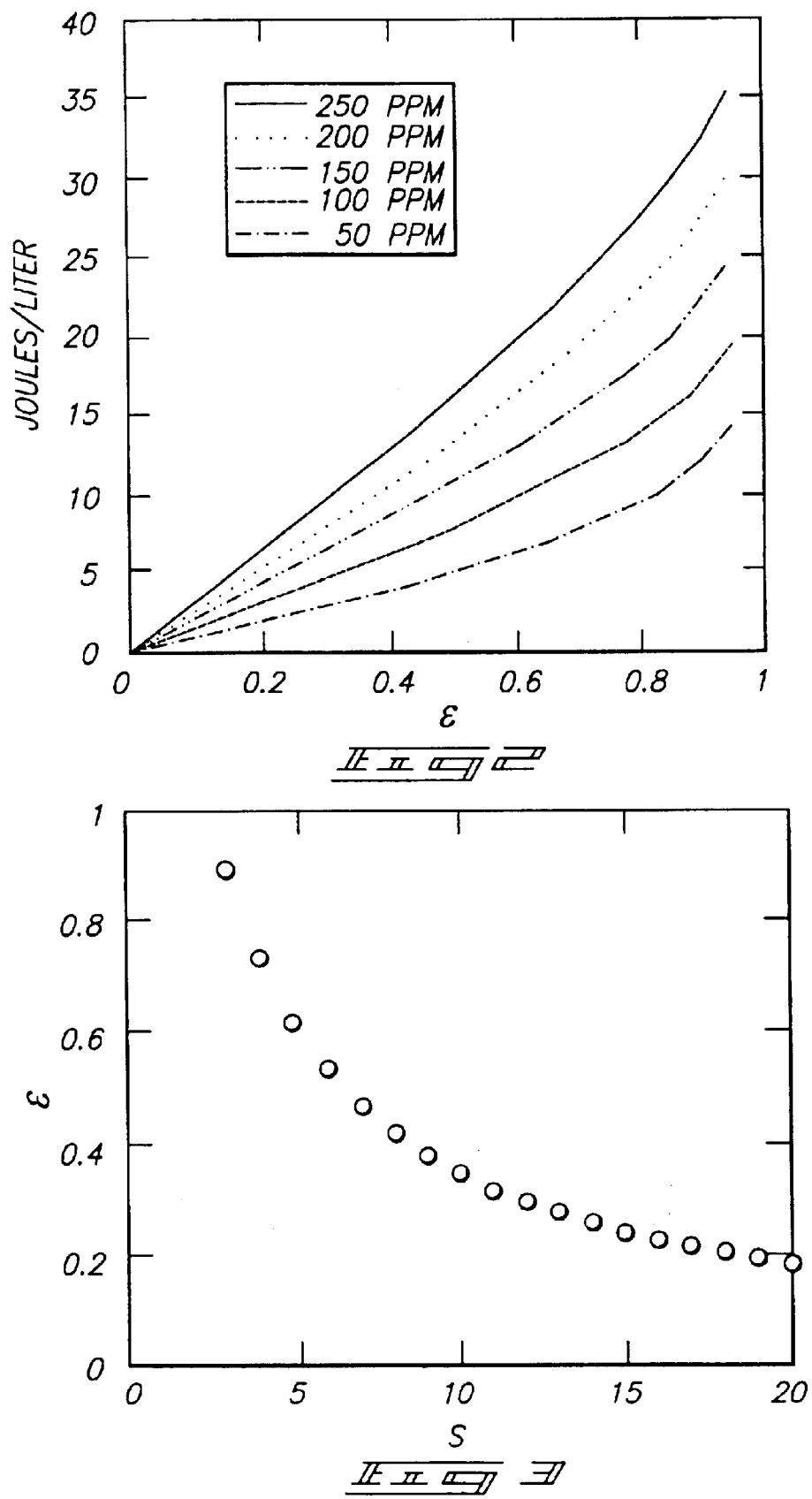

US 6,808,694 B2

$NO_x$ REDUCTION METHODS AND APPARATUSES

This invention was made with Government support under Contract DE-AC0676RLO1830 awarded by the U.S. Department of Energy. The Government has certain rights in the invention.

TECHNICAL FIELD

The invention pertains to methods of reducing $NO_x$ and apparatuses for reducing $NO_x$.

BACKGROUND OF THE INVENTION

A wide variety of technology exists that is aimed at reducing $NO_x$, wherein x is greater than zero, in emission sources. As emission limits decrease and cost reductions are desired, new $NO_x$ emission control methods are being evaluated. One emission source identified for improved $NO_x$ reduction includes lean burn spark and compression ignition engine exhaust. One example of such an emission source includes diesel engines.

A desire exists to improve $NO_x$ reduction for emission sources including, but not limited to, diesel engines.

SUMMARY OF THE INVENTION

In one aspect of the invention, a $NO_x$ reduction method includes treating a first gas containing $NO_x$, wherein x is greater than zero, and producing a second gas containing $NO_2$. A portion of the $NO_2$ in the second gas can be reduced to $N_2$ and a third gas produced containing less $NO_x$ than the first gas, substantially all of the third gas $NO_x$ being NO. The third gas can be treated and a fourth gas produced containing $NO_2$. A portion of the $NO_2$ in the fourth gas can be reduced to $N_2$ and a fifth gas produced containing less $NO_x$ than the third gas, substantially all of the fifth gas $NO_x$ being NO. As one example, a fraction of the first gas $NO_x$ treated to second gas $NO_2$ can approximately equal a fraction of the third gas $NO_x$ treated to fourth gas $NO_2$. Also, the portion of the second gas $NO_2$ reduced can be less than about 70 volume percent (vol %).

In another aspect of the invention, a $NO_x$ reduction method includes treating a first gas containing $NO_x$, wherein x is greater than zero, with a first plasma and producing a second gas containing $NO_2$. The method includes reducing a portion of the $NO_2$ in the second gas to $N_2$ with a first catalyst and producing a third gas containing less $NO_x$ than the first gas, substantially all of the third gas $NO_x$ being NO. The third gas containing $NO_x$ can be treated with a second plasma and a fourth gas produced containing $NO_2$. A portion of the $NO_2$ in the fourth gas can be reduced to $N_2$ with a second catalyst and a fifth gas produced containing less $NO_x$ than the third gas. As an example, the first and third gases can further contain hydrocarbon. Treating the first gas and reducing a portion of the $NO_2$ in the second gas can provide oxidation of less than 50 vol % of the hydrocarbon in the first gas. Treating the third gas and reducing a portion of the $NO_2$ in the fourth gas can provide oxidation of less than 50 vol % of the hydrocarbon in the third gas. The method can further include controlling energy consumption of the first and second plasmas independent of each other. A combined energy consumption of the first and second plasmas can be substantially minimized.

In yet another aspect of the invention, a $NO_x$ reduction method can include performing a step at least three times in series. The step includes converting $NO_x$, wherein x is greater than zero, comprised by an inlet gas to $NO_2$ with a plasma and catalytically reducing $NO_2$ at least to $N_2$ and NO comprised by an outlet gas. The at least three performances of the step can be operated to plasma convert approximately equal fractions of the inlet gas $NO_x$ to $NO_2$. As an example, the outlet gas of at least two of the three performances of the step can comprise the inlet gas for a subsequent performance of the step.

In a further aspect of the invention, a $NO_x$ reduction apparatus includes a plurality of reactor units in series. Individual reactor units include a plasma device and a reducing catalyst. The plasma device exhibits the property of converting $NO_x$, wherein x is greater than zero, to $NO_2$. The reducing catalyst exhibits the property of reducing $NO_2$ to a reaction product consisting essentially of $N_2$ and NO. The apparatus can further include a plurality of separate power control devices for respective plasma devices of individual reactor units. The plasma devices can include dual dielectric barrier discharge devices. The reducing catalysts can include at least one of barium zeolite Y type (Ba—Y) and sodium zeolite Y type (Na—Y).

BRIEF DESCRIPTION OF THE DRAWINGS

Preferred embodiments of the invention are described below with reference to the following accompanying drawings.

FIG. 1 is a flow diagram showing a $NO_x$ reducing method according to one aspect of the invention.

FIG. 2 is a line chart showing energy consumption at various extents of reaction ($\epsilon$) for some initial concentrations of NO.

FIG. 3 is a line chart showing the extent of reaction ($\epsilon$) at various numbers of steps (S) using a catalyst efficiency of 60% to meet 90% $NO_x$ reduction.

DETAILED DESCRIPTION OF THE PREFERRED EMBODIMENTS

Figure 4:
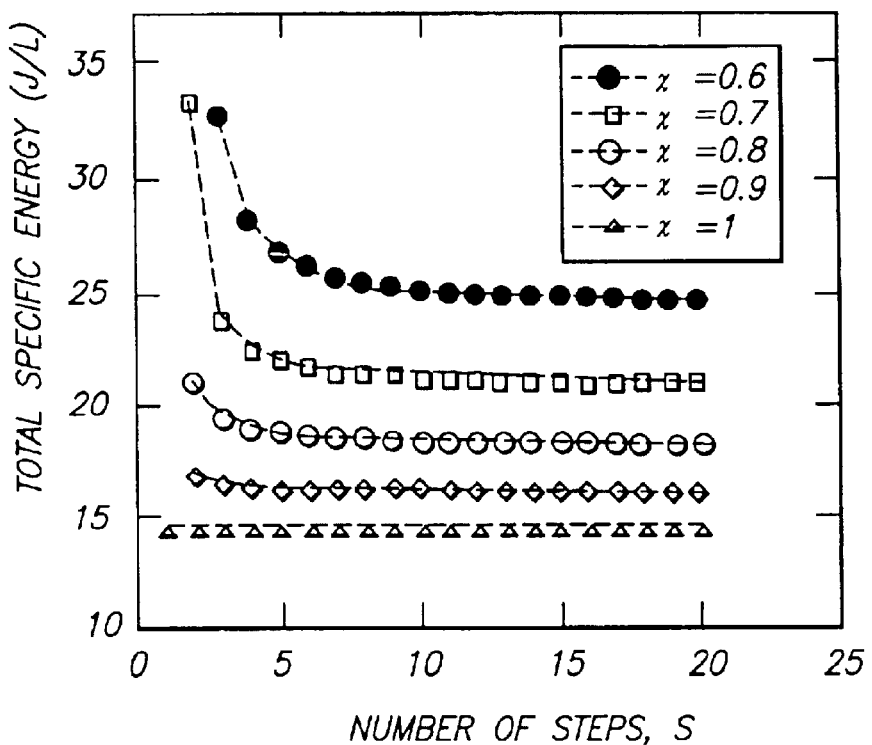
FIG. 4 is a line chart showing the effect of different catalyst efficiencies on energy consumption in comparison the number of steps (S).

A variety of investigations have occurred regarding plasma assisted catalytic treatment of $NO_x$, wherein x is greater than zero, in lean burn automobile and light duty diesel exhaust. Normally, x is also 3 or less, but the majority of $NO_x$ frequently exists as NO. Thus, studies often use synthetic exhaust containing only NO as the $NO_x$ to approximate practical conditions. One example of plasma assisted catalytic treatment of $NO_x$ includes using plasma discharge to convert $NO_x$ to $NO_2$ and providing a catalyst to convert $NO_2$ to $N_2$. The various aspects of the invention described herein may have special utility with regard to lean burn spark and compression ignition engine exhaust, but are also applicable to reducing $NO_x$ from other sources, as readily understood by those of ordinary skill in the art. Prior investigations have experienced difficulty in obtaining a 90 volume percent (vol %) $NO_x$ conversion. Effective catalysts previously tested have exhibited an upper limit less than 90 vol % under ordinary exhaust conditions.

Further investigation has newly revealed that the most efficient current catalysts release unconverted $NO_x$ in the form of NO even when enough energy is input through plasma treatment to ensure that all $NO_x$ reaches the catalyst as $NO_2$. Observation further indicates that most of the hydrocarbon input survives both the plasma and the catalyst. As a result, a composition output from plasma assisted catalytic treatment of this type can be very similar to an input composition prior to the treatment, although with lower overall $NO_x$ and hydrocarbon concentrations. A conventional approach to resolving the difficulties mentioned could include applying more plasma energy and/or a larger volume catalyst bed. However, findings indicate that a second application of plasma followed by a second catalyst bed can improve overall plasma-catalyst reactor performance. The improvement includes both increasing the level of $NO_x$ conversion as well as reducing plasma energy consumption for a given level of $NO_x$ reduction.

Although the observations described herein were ascertained in the context of plasma assisted catalytic $NO_x$ treatment, the principles described herein can be applied to other $NO_x$ reduction methods. Accordingly, in one aspect of the invention, a $NO_x$ reduction method includes treating a first gas containing $NO_x$, wherein x is greater than zero, and producing a second gas containing $NO_2$. For the most part, the treating $NO_x$ and producing $NO_2$ includes oxidation of $NO_x$, wherein x is greater than zero and less than 2. However, reduction of $NO_x$ compounds, wherein x is greater than 2 could also occur depending on the composition of the first gas. The method further includes reducing a portion of the $NO_2$ in the second gas to $N_2$ and producing a third gas containing less $NO_x$ than the first gas, substantially all of the third gas $NO_x$ being NO. The method also includes treating the third gas, producing a fourth gas containing $NO_2$, reducing a portion of the $NO_2$ in the fourth gas to $N_2$, and producing a fifth gas containing less $NO_x$ than the third gas, substantially all of the fifth gas $NO_x$ being NO. The treating of the first gas and/or the third gas and producing the second and/or fourth gas containing $NO_2$ can include treating with a plasma, as well as perhaps various oxidation techniques. Substantially all of the first gas $NO_x$ can be converted to $NO_2$ comprised by the second gas. Also, the reducing of a portion of the $NO_2$ in the second and/or fourth gas to $N_2$ can include reducing the $NO_2$ with a catalyst.

A variety of options and variations exist for the above described methods. For example, the treating of the first gas can occur separately from the reducing of $NO_2$ in the second gas and the treating of the third gas can occur separately from the reducing of $NO_2$ in the fourth gas. In a two-stage reactor configuration, a first stage of the reactor can provide a plasma or oxidation region where treating of the first gas can occur. A second stage of the reactor can provide a catalyst or reducing region where reducing a portion of the $NO_2$ in the second gas can occur.

Alternatively, the treating and reducing can occur together, as in a single-stage reactor configuration where catalyst is provided within a plasma or oxidation region. Thus, treating a first gas and reducing a portion of a second gas occur together rather than separately in different stages of a reactor. When $NO_2$ remains after the single-stage, then an additional catalyst stage could be provided to further reduce $NO_2$. As one example, a continuous catalyst bed could be used with a plurality of distributed plasma or oxidation regions along the continuous catalyst bed. Catalyst-only or reducing regions could also be used along the continuous catalyst bed downstream of the plasma or oxidation regions. The method thus could include use of a single-stage reactor configuration in regions where plasma and catalyst are combined and use of a two-stage reactor configuration by providing additional catalyst-only or reducing regions. Other methods are also conceivable using different combinations of the two-stage and/or single-stage concepts described herein.

The first and third gases can further include hydrocarbon. The treating of the first gas and reducing a portion of the $NO_2$ in the second gas can provide oxidation to $CO_2/CO$ and $H_2O$ of less than 50 vol % of the hydrocarbon in the first gas. The treating of the third gas and reducing a portion of the $NO_2$ in the fourth gas can provide oxidation to $CO_2/CO$ and $H_2O$ of less than 50 vol % of the hydrocarbon in the third gas. The method can include oxidizing less than 35 vol % of the hydrocarbon in the first and third gases. The portion of the second gas $NO_2$ reduced can be less than about 70 vol %. For example, the portion of second gas $NO_2$ reduced can be from about 50 vol % to about 60 vol %.

Despite the relatively low amount of second gas $NO_2$ reduction, the aspects of the invention described herein can provide for attaining at least 90% reduction to $N_2$ of the first gas $NO_x$. In circumstances where a catalyst exhibits less than 90 vol % reduction of $NO_2$ to $N_2$, the described methods nevertheless allow obtaining at least 90 vol % $NO_x$ reduction. As indicated, the described methods may also apply to non-catalytic techniques for reducing $NO_2$ to $N_2$.

The portion of the second gas and/or fourth gas $NO_2$ not reduced to $N_2$ is comprised by the third and fifth gases, respectively, as $NO_x$. Preferably, substantially all of the third and/or fifth gas $NO_x$ exists as NO. While "substantially all" indicates a high percentage of the $NO_x$ as NO, it can be less than 100 vol % allowing for small amounts of other $NO_x$ compounds. Alternatively, all of the third and/or fifth gas $NO_x$ can be NO.

One explanation for the presence of NO in the third gas is that the portion of the $NO_2$ not reduced to $N_2$ reverts to NO. Some reducing catalysts exhibit such a property, for example, barium zeolite Y type, sodium zeolite Y type, and potentially others. The first gas can include hydrocarbon that forms partially oxidized hydrocarbons, such as acetaldehyde, propionaldehyde, etc. during treating. Such partially oxidized hydrocarbons can act as reducing agents during the reducing of a portion of the second gas $NO_2$. Accordingly, the third gas can include a majority of the hydrocarbon existing in the first gas. A composition of the third gas including NO and hydrocarbon provides an opportunity for successively treating the gas to produce $NO_2$ and reducing a portion of the $NO_2$ to produce a gas comprising less $NO_x$. Accordingly, the method described above can further include treating the fifth gas and producing a sixth gas containing $NO_2$. A portion of the $NO_2$ in the sixth gas can be reduced to $N_2$ and a seventh gas produced containing less $NO_x$ than the fifth gas, substantially all of the seventh gas $NO_x$ being NO.

According to another aspect of the invention, a $NO_x$ reduction method includes treating a first gas containing $NO_x$, wherein x is greater than zero, with a first plasma and producing a second gas containing $NO_2$. The method provides reducing a portion of the $NO_2$ in the second gas to $N_2$ with a first catalyst and producing a third gas containing less $NO_x$ than the first gas, substantially all of the third gas $NO_x$ being NO. The third gas containing $NO_x$ can be treated with a second plasma and a fourth gas produced containing $NO_2$. A portion of the $NO_2$ in the fourth gas can be reduced to $N_2$ with a second catalyst and a fifth gas produced containing less $NO_x$ than the third gas. As an option, substantially all of the fifth gas $NO_x$ can be NO. Such a composition will likely result in a circumstance where the first catalyst exhibits a composition the same as the second catalyst, although other processing techniques may produce the composition. The method can further include treating the fifth gas with a third plasma, producing a sixth gas containing $NO_2$, reducing a portion of the $NO_2$ in the sixth gas to $N_2$ with a third catalyst, and producing a seventh gas containing less $NO_x$ than the fifth gas.

In a further aspect of the invention, a $NO_x$ reduction method can include performing a step at least three times in series, the step can include converting $NO_x$, wherein x is greater than zero, comprised by an inlet gas to $NO_2$ with a plasma and catalytically reducing $NO_2$ at least to $N_2$ and NO comprised by an outlet gas. The method includes operating the at least three performances of the step to plasma convert approximately equal fractions of the inlet gas $NO_x$ to $NO_2$. As examples, the outlet gas of at least two of the three performances of the step can comprise the inlet gas for a subsequent performance of the step. Also, similar to earlier descriptions, the step can further include oxidizing hydrocarbon from the inlet gas, the outlet gas containing greater than 50 vol % of the hydrocarbon from the inlet gas. The at least three performances of the step can be substantially identical. The at least three performance can also be performed differently and yet convert approximately equal fractions of the inlet gas $NO_x$ to $NO_2$.

FIG. 1 shows a flow diagram of a $NO_x$ reduction method encompassed by the aspects of the invention described herein. In a first step, an engine source of $NO_x$ contains an initial concentration of NO comprised by an inlet gas to a discharge plasma. The discharge plasma consumes an amount of energy $E_1$ and exhibits an extent of reaction, $\epsilon$, in the discharge plasma defined as $1-([NO]_{OUT}/[NO]_{IN})$. The discharge plasma produces some generally unknown but very reactive species called "X" at some rate $k_P$ proportional to the applied power per unit volume of inlet gas. This material is lost by quenching at some rate $k_Q$ and by reaction with NO at a rate $k_R$ to eventually yield $NO_2$.

X is believed to be produced locally and continuously in the discharge plasma and presumably very little is carried downstream. Accordingly, a steady state approximation can be made that the concentration of X does not change with respect to time. Differential equations written for the concentration of X and NO can be solved to produce Equation 1 giving energy density, Ev, as a function of extent of reaction and initial NO concentration as follows:

$$Ev = \beta_0 \ln\left(\frac{1}{1-\varepsilon}\right) + \frac{1}{k_P}\varepsilon[NO]_{IN} \quad (1)$$

wherein $\beta_0$ is defined as $k_Q/k_R k_P$ and $\epsilon$ is defined as above. A typical measured value of $\beta_0$ can equal 3 Joule/Liter (J/L) and $k_P$ can equal 9 ppm-L/J using the unfiltered exhaust stream of a diesel generator. Such typical values are presented here for illustrative purposes since the actual values depend on a variety of factors including design of the reactor containing the discharge plasma, temperature, gas composition (such as oxygen, water, and hydrocarbon concentration), and the extent of soot accumulation. FIG. 2 shows a line chart of energy density at various extents of reaction for five initial concentrations of NO. Understandably, as the extent of converting NO to $NO_2$ increases and the initial concentration of NO increases, energy consumption also increases.

Observation indicates that under lean burn conditions in a lean burn spark and compression ignition engine exhaust the oxygen content typically does not fall below the amount desired for efficient conversion of NO to $NO_2$. Excess oxygen or water tends to reduce the efficiency of NO oxidation primarily because of negative ions formed. Hydrocarbons tend to suppress reaction of radicals with $NO_2$ that convert it back to NO. Also, as indicated, partially oxidized hydrocarbons can improve the efficiency of subsequent catalyst reduction steps. Accordingly, the discharge plasma can provide further benefits aside from merely oxidizing NO to $NO_2$. Some investigation has indicated that certain small hydrocarbons such as methane, ethane, ethene, and acetylene, as well as highly unsaturated hydrocarbons such as benzene and polyaromatic hydrocarbons, might not be effective in suppressing reaction of radicals with $NO_2$ and improving the efficiency of catalytic reduction.

One example of a suitable discharge plasma includes a dual dielectric barrier discharge device, as known to those skilled in the art. Other plasma devices can be provided in the alternative. In a dual dielectric barrier discharge device, power is delivered to the gas comprising $NO_x$ using micro discharges. The micro discharges typically occur from about 10 to about 100 nanoseconds in length and are highly localized within the device. Preferably, the micro discharges tend to fill the device volume and produce a uniform blue glow in air at 1 atmosphere.

Gas flowing from the discharge plasma shown in FIG. 1 enters a catalyst stage exhibiting an efficiency of $\chi_{CAT}$ for reducing $NO_2$ to $N_2$ and perhaps non-$NO_x$ byproducts including $N_2O$, HCN, etc. Although technically within the $NO_x$ definition used herein, $N_2O$ is not included as $NO_x$ in measuring $\chi_{CAT}$ since it is not currently regulated as $NO_x$ in the United States of America. In the event of regulatory changes, $N_2O$ could easily be included in measuring $\chi_{CAT}$. A concentration of NO indicated in FIG. 1 as $[NO]_1$ exits the first step of the $NO_x$ reduction method and proceeds to a second step. Some number of steps, S, each including a discharge plasma stage and a catalyst stage can be used to obtain a desired level of $NO_x$ reduction. Notably, FIG. 1 assumes an extent of reaction for the discharge plasma and a catalyst efficiency substantially equivalent in each step. However, different discharge plasmas and/or catalysts or catalyst bed designs could be used in the various steps creating different extents of reaction and catalyst efficiencies in the steps.

FIG. 3 shows a line chart of the extent of reaction at various numbers of steps that will meet a target of 90 vol % $NO_x$ reduction assuming a catalyst efficiency of 60%. FIG. 1 assumes an adequate hydrocarbon concentration and catalyst volume to convert all $NO_2$ from each discharge plasma to $N_2$ or NO. Accordingly, no $NO_2$ enters the plasma discharge of a subsequent step. The minimum S is given by Target$\geq(1-\chi_{CAT})^S$, where Target is defined as $[NO_x]_{exhaust}/[NO_x]_{engine}$. Algebraic manipulation yields Equation 2 as follows:

$$\varepsilon = \frac{1 - Target^{1/S}}{\chi_{CAT}} \quad (2)$$

used to produce FIG. 3. In FIG. 3, a three step reduction method could obtain the 90 vol % $NO_x$ reduction by oxidizing at least 90 vol % of the NO to $NO_2$ in the plasma discharge at each step. For a fifteen step method, as little as 25 vol % of the NO could be oxidized at each step and still meet the 90 vol % $NO_x$ reduction target.

Figure 5:
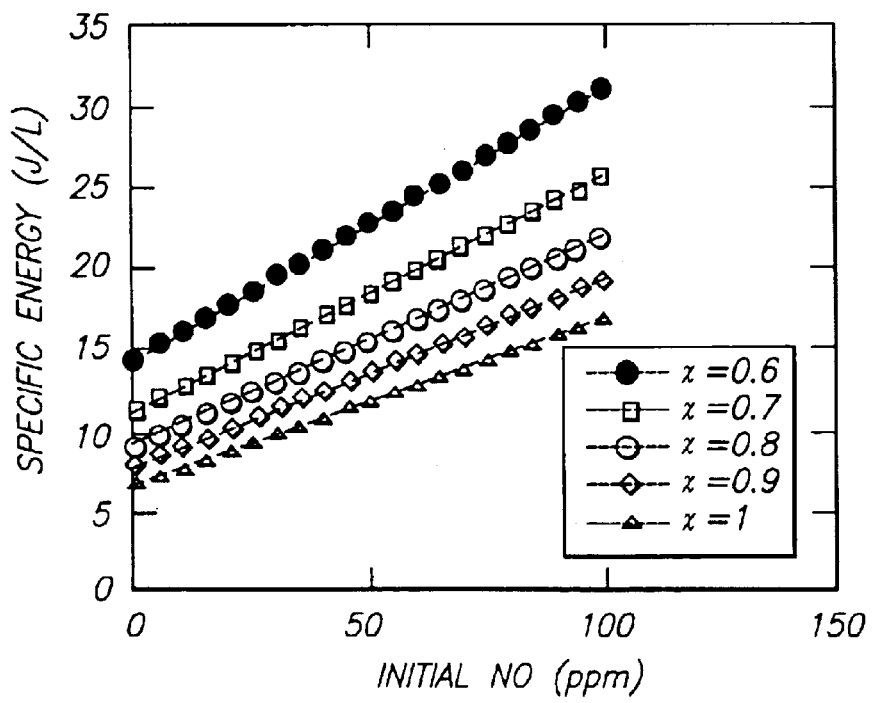
FIG. 5 is a line chart showing energy consumption at various initial concentrations of NO for some catalyst efficiencies, assuming five steps.

Further algebraic manipulation can be used to produce an expression for total electrical energy as follows in Equation 3:

$$Ev_{Total} = \beta_0 S \ln\left(\frac{1}{1-\varepsilon}\right) + \frac{1 - Target}{\chi_{CAT}} \frac{[NO_x]_{exhaust}}{k_P} \quad (3)$$

which is used to generate FIG. 4. FIG. 4 assumes that $\beta_0$ is 3, $k_P$ is 9, $[NO]_{engine}$ is 75 ppm and Target is 0.10 ($NO_x$ reduction of 90 vol %). FIG. 4 shows that increasing $\chi_{CAT}$ reduces energy consumption. FIG. 4 also shows that as $\chi_{CAT}$ decreases the significance of providing multiple steps increases as a way to reduce energy consumption. For example, in the limiting case where $\chi_{CAT}$ is 1, no advantage exists regarding energy consumption in providing multiple steps. When $\chi_{CAT}$ is 0.9, the reduction in energy consumption appears less significant for providing multiple steps in comparison to when $\chi_{CAT}$ is 0.6. Equation 3 can also be used to generate FIG. 5 by choosing S as 5 and varying $[NO]_{engine}$. FIG. 5 shows that energy consumption increases with increasing initial $NO_x$ concentration in an essentially linear fashion.

The mathematical manipulations to obtain Equation 3 above included finding the energy at each step. It was determined that total energy consumption can be minimized by making $\varepsilon$ identical at each step. Accordingly, Equation 4 can be written for the energy of a given step k as follows:

$$Ev_k = \beta_0 \ln\left(\frac{1}{1-\varepsilon}\right) + \varepsilon(2\varepsilon - \varepsilon\chi_{CAT} - 1)^{k-1} \frac{[NO_x]_{exhaust}}{k_P} \quad (4)$$

and used to establish that energy consumption decreases for each step of the method. The methods described above can further include controlling energy consumption in the first and second plasmas independent of each other such that the discharge plasmas exhibit substantially the same $\varepsilon$. FIG. 2 shows that for a given $\varepsilon$ the energy consumption of a step will decrease as the initial $NO_x$ concentration decreases. Accordingly, such a control scenario provides one example of how combined energy consumption of the first and second plasmas can be substantially minimized. Where additional steps are used in a $NO_x$ reduction method, minimization of total energy usage for plasma conversion of $NO_x$ to $NO_2$ can be accomplished similarly for some or all of the performances of the steps. In keeping with the principles described herein regarding energy consumption, additional opportunities can be identified for minimizing energy in the various aspects of the invention.

Figure 6:
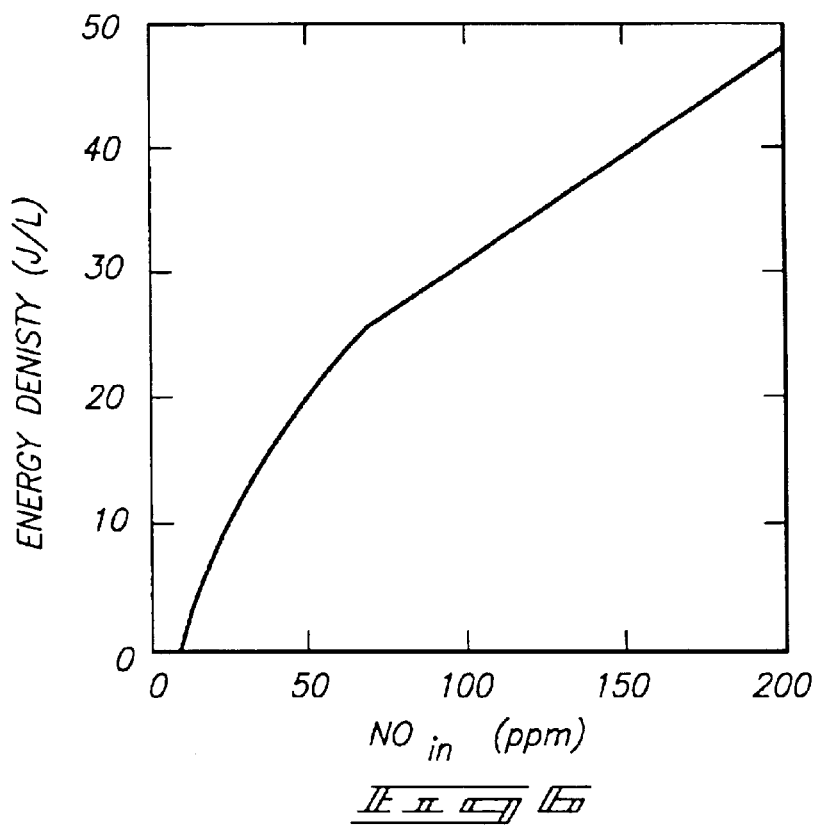
FIG. 6 is a line chart showing energy consumption at various initial concentrations of NO for a system set to reduce NO to 7 ppm or by 90 volume percent (vol %), whichever is greater.

Understandably, a circumstance may exist where instead of a percentage of inlet $NO_x$ reduced as a target, a target could be a numerical concentration of $NO_x$. The equations described above and various aspects of the invention also apply to a numerical concentration target. For example, FIG. 6 shows a line chart of energy consumption at various values of NO concentration using both a 90 vol % target and a 7 ppm $NO_x$ target. That is, the hypothetical system described by FIG. 6 is set to reduce $NO_x$ to 7 ppm or by 90 vol %, whichever is greater. When $NO_x$ falls below 7 ppm, treatment ceases.

In keeping with various aspects of a $NO_x$ reduction method above, the invention also includes various $NO_x$ reduction apparatuses. According to one aspect of the invention, a $NO_x$ reduction apparatus includes a plurality of reactor units in series, individual reactor units including a plasma device and a reducing catalyst. The plasma device can exhibit the property of converting $NO_x$, wherein x is greater than zero, to $NO_2$. The reducing catalyst can exhibit the property of reducing $NO_2$ to a reaction product consisting essentially of $N_2$ and NO. Various catalyst efficiencies are represented herein for reducing $NO_2$ to $N_2$. $NO_2$ reduced to $N_2$ can be less than about 70 vol %. The $NO_2$ reduced can also be from about 50 vol % to about 60 vol %. Largely, the portion of the $NO_2$ not reduced to $N_2$ is converted to NO such that the reaction product consists essentially of $N_2$ and NO. The reaction product can include trace amounts of other chemical species, such as $N_2O$, HCN, etc. and still consist essentially of $N_2$ and NO. However, the reaction product can instead consist of $N_2$ and NO.

The plasma device and reducing catalyst of the $NO_x$ reduction apparatus can be separated. Also, at least one of the plurality of reactor units can exhibit the property of oxidizing less than 50 vol % of hydrocarbon input to $CO/CO_2$ and $H_2O$. The at least one reactor unit can oxidize less than 35 vol % of the hydrocarbon input. The reactor units' catalysts can exhibit a same composition. Preferably, the reducing catalysts include at least one of barium zeolite Y type and sodium zeolite Y type. The plasma devices can include dual dielectric barrier discharge devices. Further, the plurality of reactor units can include three reactor units. The $NO_x$ reduction apparatus can further comprise a plurality of separate power control devices for respective plasma devices of individual reactor units. Separate power control devices provide the advantage of controlling the energy consumption of the plasma devices independently. Accordingly, independent power control provides for substantially minimizing combined energy consumption of the plasma devices by plasma converting the same amount of $NO_x$ to $NO_2$ in individual plasma devices of the reactor units.

The plurality of reactor units in series can also be referred to as a cascaded reactor system. Such a system can be engineered with a robust design. As one example, providing more reactor units than sufficient to reach a target $NO_x$ reduction allows the advantage that loss of a single reactor unit imposes little impact on the performance and/or energy requirements for the $NO_x$ reduction apparatus. In such circumstance, increase in energy supply to remaining reactor units compensates for the loss of a single reactor unit. More redundant reactor units can be provided for an even more robust design. As can be seen from Equation 4, the addition of redundant reactor units reduces the extent of reaction of each unit and correspondingly reduces the power consumption of each unit. Reducing power and voltage applied to the plasma devices extends the life of the plasma devices, a power supply to the devices, and the associated electrical connections. Further, providing redundant reactor units might even justify sizing reactor units and the associated power supplies smaller than otherwise warranted.

EXAMPLE

An apparatus was configured including separate plasma discharge and catalyst stages that were separately heated.

The plasma discharge was generated in a double dielectric barrier device called a tube array reactor (TAR). The TAR plasma was generated between an array of oppositely polarized electrodes inside single ended alumina tubes suspended in a synthetic gas stream to be oxidized. The distance between oppositely polarized tubes can be maintained between 1 and 3 millimeters (mm). A larger separation of electrodes could be used as a way to reduce back pressure, but might produce significantly higher turn-on voltage. For the present example, 2 mm electrode spacings were used. A large TAR had three high voltage electrodes surrounded by a grid of eight ground electrodes. A small TAR had two high voltage electrodes surrounded by six ground electrodes. Both TARs were machined from high temperature machinable ceramic material and the alumina tubes were held in place by high temperature RTV adhesive. Locating the outermost ground electrodes against the reactor walls allowed all of the gas flow through the discharge regions. The large TAR was used as the first plasma stage and the small TAR was used as the second plasma stage. Both TARs were operated with sinusoidal high voltage at 400 hertz from high voltage transformers.

The catalyst stages were configured using barium zeolite Y type catalyst formed from sodium zeolite Y type catalyst (CBV-100) obtained in extrudate form from Zeolyst International (Valley Forge, Pa.) and ion exchanged with barium. The space velocity for each bed was operated at 12,000 per hour. Accordingly, each bed held 10 cubic centimeters of extrudate to provide the desired space velocity for a 2 standard liter per minute (slm) flow. The overall hourly space velocity was therefore 6,000 per hour. A synthetic exhaust mixture was used containing 2 vol % water, 6 vol % oxygen, 200 ppm NO, and 600 ppm propene with the balance $N_2$. Water was added at room temperature by diverting the nitrogen plus oxygen flow through a water bubbler, limiting water concentration to about 2 vol % but enabling operation without heated lines. The TARs were maintained at 100C. and the catalyst stages were maintained between 160 and 180C.

$NO_x$ data was obtained using either a chemiluminescent analyzer (CLA) (California Analytical Model 400-HCLD) or a Fourier Transform Infrared Spectrometer (FTIR) (Nicolet Magna-IR560) equipped with a 2 meter gas cell and operated at 0.5 centimeter$^{-1}$ resolution. Pressure was controlled at 760 Torr and temperature at 165C.

Figure 7:
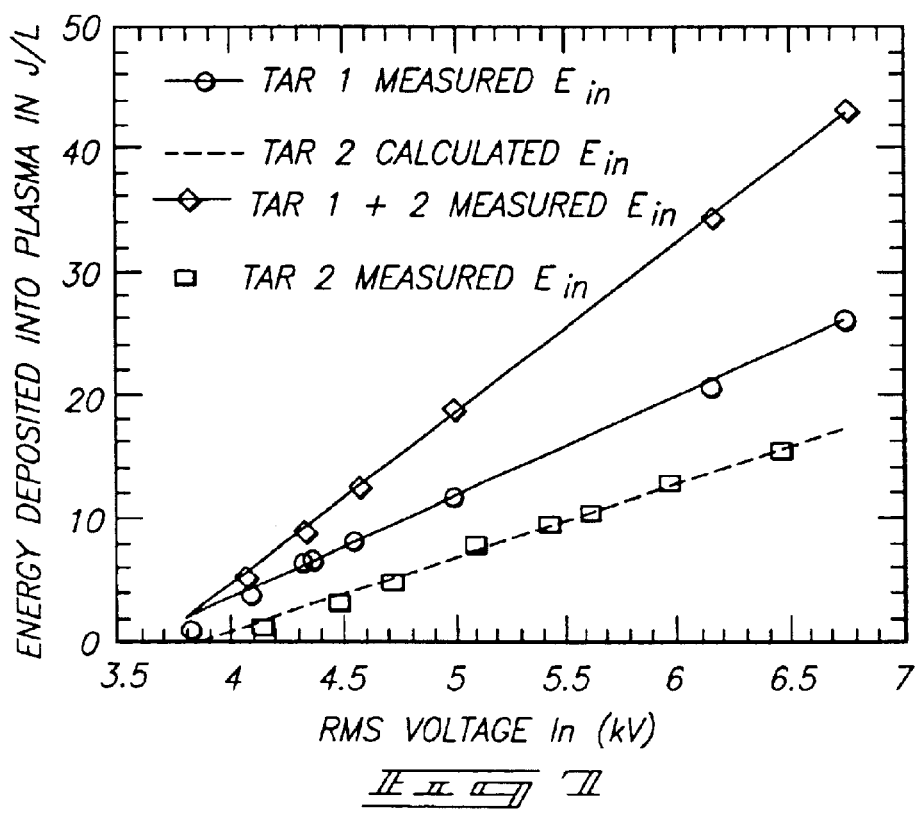
FIG. 7 is a line chart showing energy consumption at various voltages for a first tube array reactor, a second tube array reactor, and the two tube array reactors combined.
Figure 8:
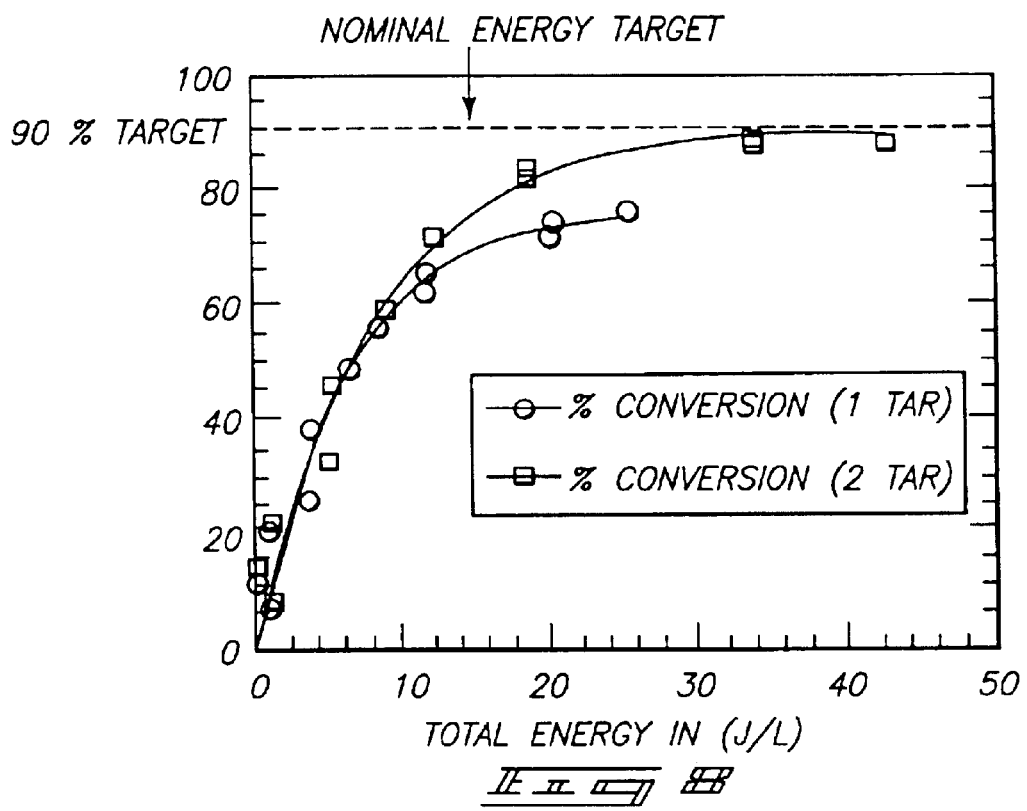
FIG. 8 is a line chart showing the vol % of NO reduced at various levels of energy usage for a one reactor and two reactor apparatus.

FIG. 7 shows calibration measurements for energy deposited into plasmas of the first and/or second TARs at various voltages. FIG. 8 illustrates the vol % of $NO_x$ reduced in the test apparatus using only the first TAR and both TARs in combination. At low power little difference exists in the vol % reduction for one TAR compared to two TARs. However, the energy savings possible by using a second TAR is exemplified by observing the relative energy consumption at 70 vol % $NO_x$ conversion. Operating with one TAR requires noticeably more energy in comparison to operating with two TARs to achieve 70 vol %. Further, for the nominal energy consumption target of 15 J/L a significantly higher vol % conversion can be obtained using two TARs in comparison to one TAR.

Figure 9:
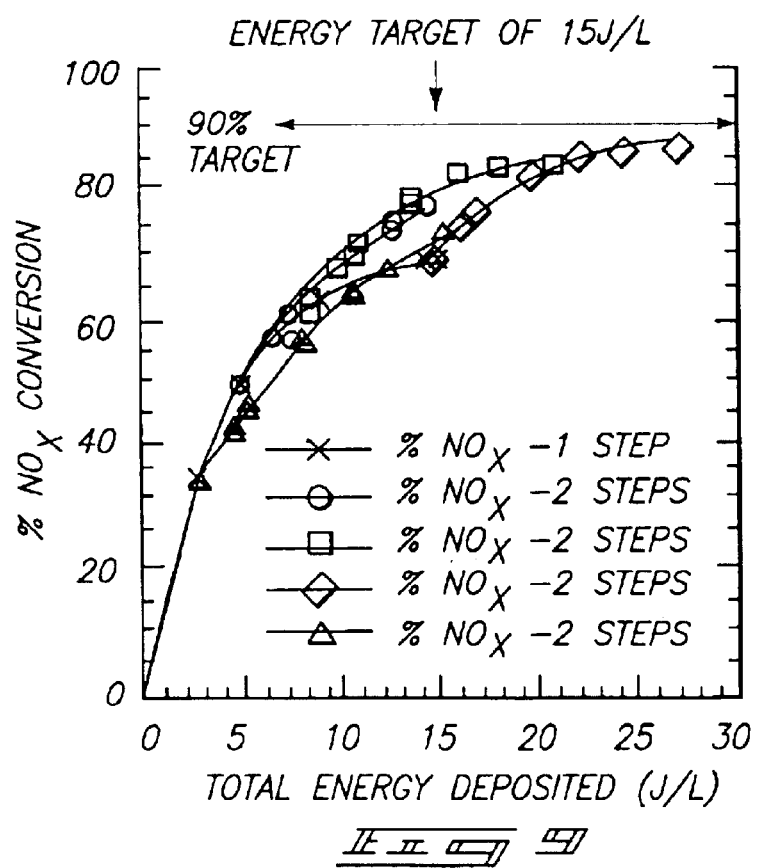
FIG. 9 is a line chart showing the vol % of NO reduced at various levels of energy consumption for a one reactor apparatus and some energy inputs to a second reactor of a two reactor apparatus.

FIG. 9 shows vol % $NO_x$ conversion data taken using independent control of power to the first and second TAR. One line is shown representing supplying power only to the first TAR. Four additional lines are shown wherein the power to the first TAR was fixed at the beginning point of each of such curves and the power to the second TAR increased to establish a higher vol % $NO_x$ reduction. Notably, the highest vol % $NO_x$ reduction was obtained by supplying about 15 J/L to the first TAR and supplying an almost equivalent additional amount of energy to the second TAR. Although a target of at least 90 vol % reduction was not obtained, it seems apparent that adding a third reactor unit may enable attaining higher vol % reduction. FIG. 9 also exemplifies the potential energy savings available using separate energy controls for the TARs. In FIG. 9, 80 vol % $NO_x$ reduction was attained at about 14.4 J/L with about 8.4 J/L supplied to the first TAR and the remaining 6 J/L supplied to the second TAR. The data in FIG. 8 was generated using equal energy supply to each TAR and consumed about 18 J/L total energy to attain 80 vol % $NO_x$ reduction. Accordingly, an energy savings of about 20% was realized by providing independent control of energy consumption to the first and second TARs.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A $NO_x$ reduction method comprising:
    treating a first gas comprising $NO_x$, wherein x is greater than zero, and producing a second gas comprising $NO_2$;
    reducing a portion of the $NO_2$ in the second gas to $N_2$ and producing a third gas comprising less $NO_x$ than the first gas, substantially all of the third gas $NO_x$ being NO;
    treating the third gas and producing a fourth gas comprising $NO_2$; and
    reducing a portion of the $NO_2$ in the fourth gas to $N_2$ and producing a fifth gas comprising less $NO_x$ than the third gas, substantially all of the fifth gas $NO_x$ being NO.

2. The method of claim 1 wherein treating the first gas occurs separately from reducing $NO_2$ in the second gas, and wherein treating the third gas occurs separately from reducing $NO_2$ in the fourth gas.

3. The method of claim 1 wherein the method further comprises:
    treating the fifth gas and producing a sixth gas comprising $NO_2$; and
    reducing a portion of the $NO_2$ in the sixth gas to $N_2$ and producing a seventh gas comprising less $NO_x$ than the fifth gas, substantially all of the seventh gas $NO_x$ being NO.

4. The method of claim 1 wherein the first and third gases further comprise hydrocarbon, wherein treating the first gas and reducing a portion of the $NO_2$ in the second gas provides oxidation of less than 50 volume percent (vol %) of the hydrocarbon in the first gas, and wherein treating the third gas and reducing a portion of the $NO_2$ in the fourth gas provides oxidation of less than 50 vol % of the hydrocarbon in the third gas.

5. The method of claim 4 comprising oxidizing less than 35 vol % of the hydrocarbon in the first and third gases.

6. The method of claim 1 wherein a fraction of the first gas $NO_x$ treated to $NO_2$ in the second gas approximately equals a fraction of the third gas $NO_x$ treated to $NO_2$ in the fourth gas.

7. The method of claim 1 wherein the portion of second gas $NO_2$ reduced to $N_2$ is less than about 70 vol %.

8. The method of claim 7 wherein the portion of second gas $NO_2$ reduced to $N_2$ is from about 50 vol % to about 60 vol %.

9. The method of claim 1 wherein all of the third and fifth gas $NO_x$ is NO.

10. A $NO_x$ reduction method comprising:
treating a first gas comprising $NO_x$, wherein x is greater than zero, with a first plasma and producing a second gas comprising $NO_2$;
reducing a portion of the $NO_2$ in the second gas to $N_2$ with a first catalyst and producing a third gas comprising less $NO_x$ than the first gas, substantially all of the third gas $NO_x$ being NO;
treating the third gas comprising $NO_x$ with a second plasma and producing a fourth gas comprising $NO_2$; and
reducing a portion of the $NO_2$ in the fourth gas to $N_2$ with a second catalyst and producing a fifth gas comprising less $NO_x$ than th third gas.

11. The method of claim 10 wherein treating the first gas occurs separately from reducing $NO_2$ in the second gas, and wherein treating the third gas occurs separately from reducing $NO_2$ in the fourth gas.

12. The method of claim 10 wherein treating the first gas occurs together with reducing $NO_2$ in the second gas.

13. The method of claim 10 wherein the method further comprises:
treating the fifth gas with a third plasma and producing a sixth gas comprising $NO_2$; and
reducing a portion of the $NO_2$ in the sixth gas to $N_2$ with a third catalyst and producing a seventh gas comprising less $NO_x$ than the fifth gas.

14. The method of claim 10 wherein substantially all of the fifth gas $NO_x$ is NO.

15. The method of claim 10 wherein the first and third gases further comprise hydrocarbon, wherein treating the first gas and reducing a portion of the $NO_2$ in the second gas provides oxidation of less than 50 vol % of the hydrocarbon in the first gas, and wherein treating the third gas and reducing a portion of the $NO_2$ in the fourth gas provides oxidation of less than 50 vol % of the hydrocarbon in the third gas.

16. The method of claim 15 comprising oxidizing less than 35 vol % of the hydrocarbon in the first and third gases.

17. The method of claim 10 wherein a fraction of the first gas $NO_x$ plasma treated to $NO_2$ in the second gas approximately equals a fraction of the third gas $NO_x$ plasma treated to $NO_2$ in the fourth gas.

18. The method of claim 10 wherein the portion of second gas $NO_2$ reduced to $N_2$ is less than about 70 vol %.

19. The method of claim 18 wherein the portion of second gas $NO_2$ reduced to $N_2$ is from about 50 vol % to about 60 vol %.

20. The method of claim 10 wherein all of the third and fifth gas $NO_x$ is NO.

21. The method of claim 10 wherein the first catalyst exhibits a composition the same as the second catalyst.

22. The method of claim 10 wherein the method further comprises controlling energy consumption of the first and second plasmas independent of each other.

23. The method of claim 22 further comprising substantially minimizing a combined energy consumption of the first and second plasmas.

24. A $NO_x$ reduction method comprising:
performing a step at least three times in series, the step comprising converting $NO_x$, wherein x is greater than zero, comprised by an inlet gas to $NO_2$ with a plasma and catalytically reducing $NO_2$ at least to $N_2$ and NO comprised by an outlet gas; and
operating the at least three performances of the step to plasma convert approximately equal fractions of the inlet gas $NO_x$ to $NO_2$.

25. The method of claim 23 wherein th at least three performances of the step are substantially identical.

26. The method of claim 23 further comprising substantially minimizing a combined energy usage of the plasma conversion for the at least three performances of the step.

27. The method of claim 23 wherein the outlet gas of at least two of the three performances of the step comprises the inlet gas for a subsequent performance of the step.

28. The method of claim 23 wherein the step further comprises oxidizing hydrocarbon from the inlet gas, the outlet gas containing greater than 50 vol % of the hydrocarbon from the inlet gas.

29. The method of claim 28 comprising oxidizing less than 35 vol % of the hydrocarbon in the inlet gas.

* * * * *

UNITED STATES PATENT AND TRADEMARK OFFICE
CERTIFICATE OF CORRECTION

PATENT NO. : 6,808,694 B2
DATED : October 26, 2004
INVENTOR(S) : Russell G. Tonkyn et al.

It is certified that error appears in the above-identified patent and that said Letters Patent is hereby corrected as shown below:

Column 2,
Lines 37-38, replace "consumption in comparison the" with -- consumption in comparison with the --.

Column 5,
Line 35, replace "three performance" with -- three performances --.

Column 11,
Line 16, replace "than th" with -- than the --.

Column 12,
Lines 29, 31, 34 and 37, replace "claim 23" with -- claim 24 --.
Line 29, replace "wherein th at least" with -- wherein tha at least --.

Signed and Sealed this

Seventh Day of June, 2005

JON W. DUDAS
*Director of the United States Patent and Trademark Office*